(12) United States Patent (10) Patent No.: US 8,972,844 B2
Marum et al. (45) Date of Patent: Mar. 3, 2015

(54) DYNAMIC DIGITAL DOCUMENT FIELDS BEHAVIOR

(75) Inventors: Matthew G. Marum, Cary, NC (US); Samuel Padgett, Raleigh, NC (US); Steven K. Speicher, Holly Springs, NC (US); Michael J. Tabb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 13/284,619

(22) Filed: Oct. 28, 2011

(65) Prior Publication Data

US 2013/0111322 A1 May 2, 2013

(51) Int. Cl.
*G06F 17/25* (2006.01)
*G06F 17/24* (2006.01)
*G06F 17/26* (2006.01)

(52) U.S. Cl.
CPC .................................. *G06F 17/243* (2013.01)
USPC .......................................... 715/223; 715/220

(58) Field of Classification Search
USPC ....................................................... 715/223
See application file for complete search history.

(56) References Cited

U.S. PATENT DOCUMENTS

| 4,763,356 | A  | * | 8/1988  | Day et al. ....................... 379/368 |
| 5,640,501 | A  |   | 6/1997  | Turpin |
| 6,950,553 | B1 | * | 9/2005  | Deere ............................ 382/218 |
| 6,995,746 | B2 |   | 2/2006  | Aymeric |
| 7,346,606 | B2 | * | 3/2008  | Bharat ................................. 1/1 |
| 7,836,010 | B2 | * | 11/2010 | Hammond et al. ........... 707/705 |
| 7,904,829 | B2 | * | 3/2011  | Fox et al. ...................... 715/810 |
| 2005/0210006 | A1 | * | 9/2005  | Robertson et al. ................ 707/3 |
| 2005/0289140 | A1 | * | 12/2005 | Ford et al. .......................... 707/5 |
| 2006/0136411 | A1 | * | 6/2006  | Meyerzon et al. ................ 707/5 |
| 2009/0234623 | A1 | * | 9/2009  | Germain et al. .................. 703/6 |
| 2012/0072832 | A1 | * | 3/2012  | Tanaka .......................... 715/236 |
| 2013/0007003 | A1 | * | 1/2013  | Shyr et al. ..................... 707/741 |

OTHER PUBLICATIONS

Robertson et al., "Simple BM25 Extension to Multiple Weighted Fields", 2004, ACM. pp. 42-49.*
Cockburn, Andy et al., "Improving the Acquisition of Small Targets", Human-Computer Interaction Lab, Department of Computer Science, University of Canterbury, Christchurch, New Zealand Sep. 2003 , 16 pages.
Grossman, Tovi et al., "The Bubble Cursor: Enhancing Target Acquisition by Dynamic Resizing of the Cursor's Activation Area", Department of Computer Science University of Toronto Obtained from: www.dgp.toronto.edu Apr. 2-7, 2005 , 10 pages.

* cited by examiner

*Primary Examiner* — James J Debrow
(74) *Attorney, Agent, or Firm* — DeLizio Gilliam, PLLC (57) ABSTRACT

A field attraction module attracts/detracts interaction to/from particular fields of a digital document. The module detects interaction in the digital document corresponding to a plurality of fields of the digital document is detected. The module determines field attraction weights associated with the plurality of fields. The field attraction weights represent a degree to which presentation of the digital document is modified for selectively attracting interaction to at least one of the plurality of fields. The module determines that a first of the plurality of fields is associated with a greatest of the field attraction weights. The module modifies presentation of the digital document to attract interaction to the first field in the digital document in accordance with the greatest of the field attraction weights.

20 Claims, 5 Drawing Sheets

DYNAMIC DIGITAL DOCUMENT FIELDS BEHAVIOR

BACKGROUND

Embodiments of the inventive subject matter generally relate to the field of digital documents, and, more particularly, to modifying field behavior based on field attraction weights.

An electronic/digital form includes fields to receive information from a user. Digital forms can be presented with word processing applications, web browsers, etc. Forms are often created with a static marker (e.g., an asterisk) or pre-defined coloring to emphasize a field.

SUMMARY

Embodiments of the inventive subject matter include a method for attracting/detracting interaction to/from a field of a digital document. Interaction in a digital document corresponding to a plurality of fields of the digital document is detected. Field attraction weights associated with the plurality of fields are determined. The field attraction weights represent a degree to which presentation of the digital document is modified for selectively attracting interaction to at least one of the plurality of fields. It is determined that a first of the plurality of fields is associated with a greatest of the field attraction weights. Presentation of the digital document is modified to attract interaction to the first field in the digital document in accordance with the greatest of the field attraction weights.

BRIEF DESCRIPTION OF THE DRAWINGS

The present embodiments may be better understood, and numerous objects, features, and advantages made apparent to those skilled in the art by referencing the accompanying drawings.

FIGS. 1-3 depict example conceptual diagrams of a field attraction module monitoring a form and modifying presentation of fields of the form.

FIG. 1 depicts an example conceptual diagram of the field attraction module monitoring the form.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to modifying visual presentation of fields in accordance with weights, embodiments can adjust presentation of fields for other perceptual senses. In other instances, well-known instruction instances, protocols, structures and techniques have not been shown in detail in order not to obfuscate the description.

A digital document with fields (hereinafter "form") can contain numerous fields for inputting information and/or communicating information. People will quickly fill out the form without regard to mistakes, and people will skip fields in the form. Often, these fields have varying degrees of importance. For instance, a field for drug allergies can have greater importance than a field for a name of an insurance company on a medical intake form. The importance, though, can be subjective. For a patient and medical professionals, the drug allergies field has greater importance than the insurance company name. Insurance personnel, however, will consider the name of the insurance company to be of greater importance.

Associating modifiers or weights, which represent degrees of field importance, allows fields of a form to be presented with an appropriate attraction with respect to other fields and with respect to the current user. The form is presented to attract user interaction of some form to a field. As examples, the form can be presented to attract attention, field selection, input, etc. After a form is loaded, the appropriate weights are determined for fields of the form. As a user interacts with the form, the presentation of the fields is adjusted in accordance with the weight associated therewith. Information about interaction with the form can be collected over repeat uses for a form, and then used to adjust the weights.

Figure 1:
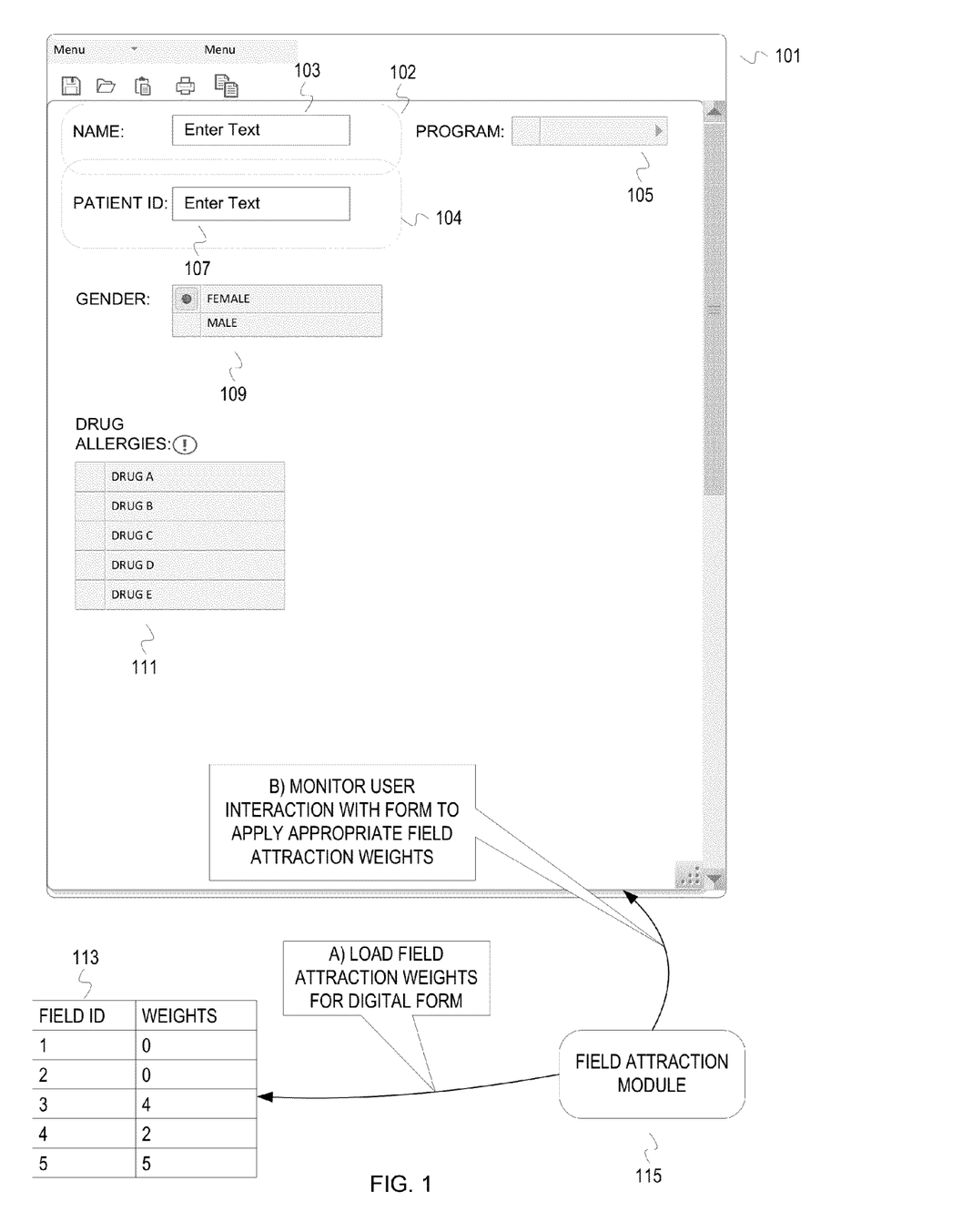
Figure 2:
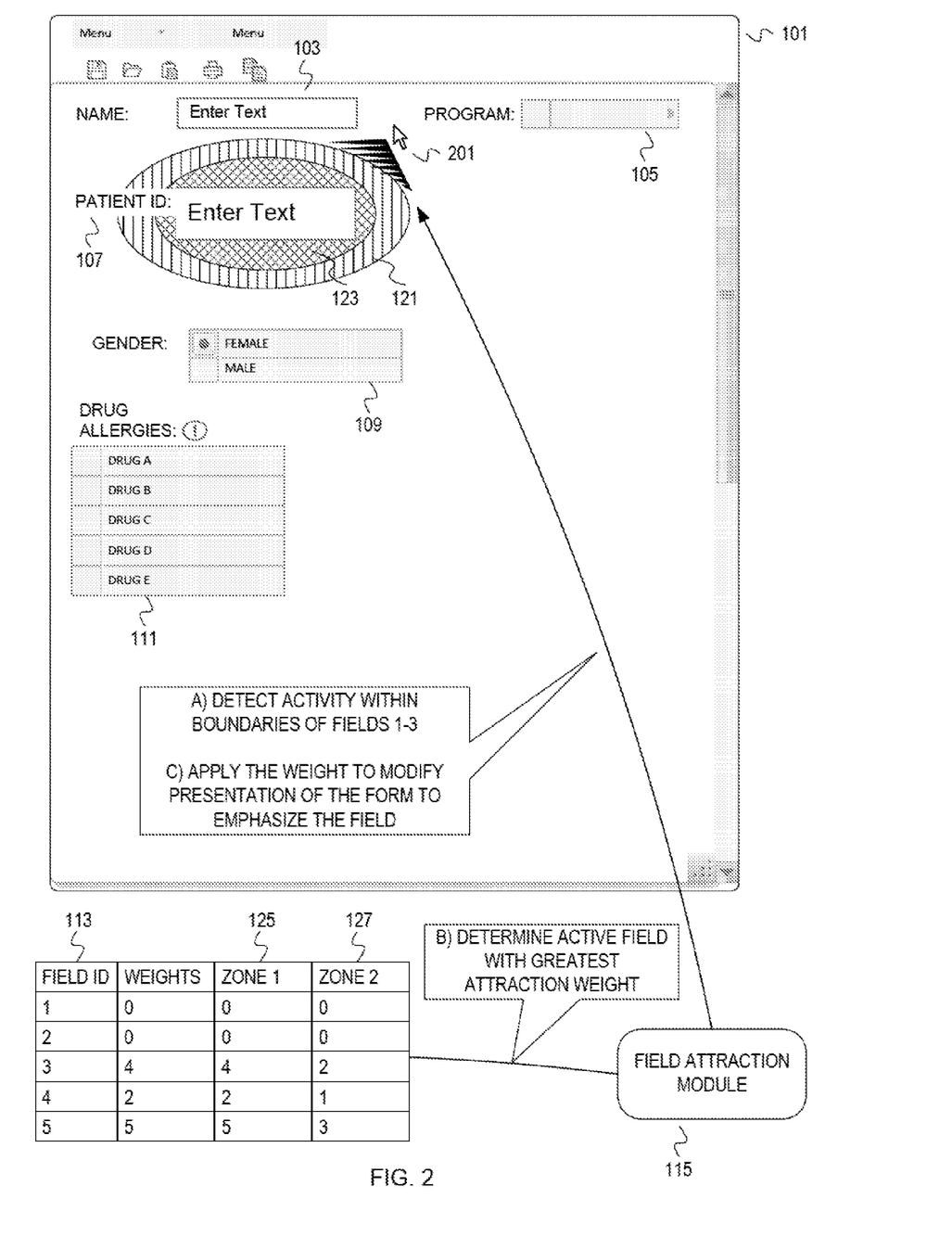
FIG. 2 depicts the example conceptual diagram of the field attraction module detecting activity in a region of a weighted field.
Figure 3:
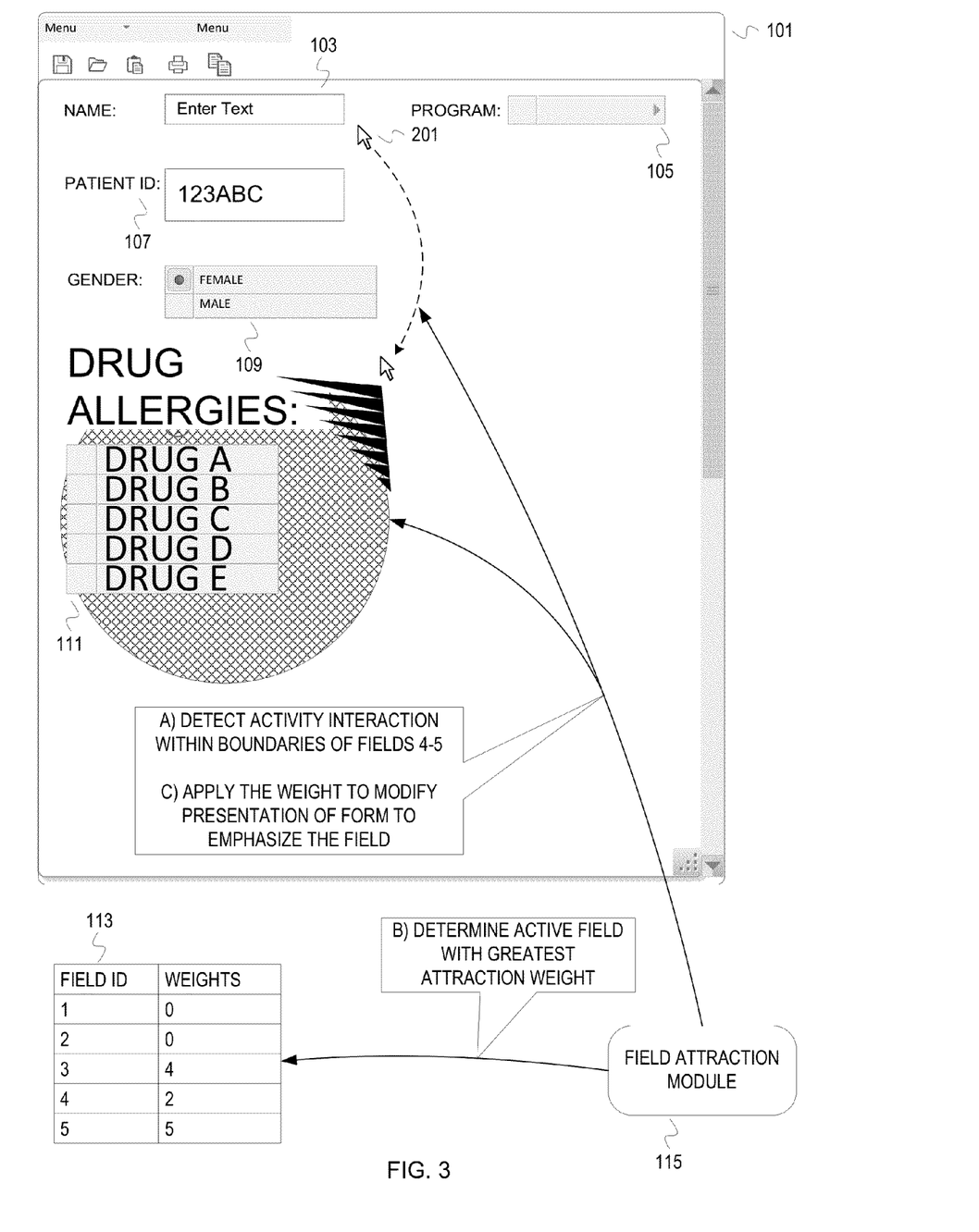
FIG. 3 depicts an example conceptual diagram of the field attraction module modifying presentation of the form when user interaction transitions to a different field.

FIGS. 1-3 depict example conceptual diagrams of a field attraction module monitoring a form and modifying presentation of fields of the form. FIG. 1 depicts an example conceptual diagram of the field attraction module monitoring the form. A form 101 is depicted with several fields. The fields include a name field 103, a clinical program field 105, a patient identifier field 107, a gender field 109, and a drug allergies field 111. The name field 103 and the patient identifier field 107 are text fields. The clinical program field 105 is a drop down menu field for a user to select a clinical program. The gender field 109 is a radio button field. The drug allergies field 111 is a field with multiple checkbox sub-fields for selecting drugs that cause allergic reactions.

In this illustrative example, each of the fields is associated with a region of activation. When a user enters the region of activation the associated field is activated. Detecting a user entering a region of activation will vary by device and technique. For example, a device detects a mouse cursor hovering over an activation region. As another example, a device detects when a user drags a finger or touches an area within the activation region. FIG. 1 depicts a boundary 102 for the activation region of the field 103, and a boundary 104 for the activation region of the field 107. The other activation regions are not depicted to avoid complicating the illustration. Although not necessary, the activation regions of for the field 103 and the field 107 overlap.

When the form 101 is loaded, a field attraction module 115 loads a field attraction configuration that indicates field attraction weights for the fields of the form 101 (Stage A). The field attraction module 101 can be a module of the program presenting the form 101, a plug-in for the program, an extension of the program, etc. In some embodiments, the field attraction configuration is embedded in the form 101 (e.g., as metadata, in field parameters, etc.). In some embodiments, the field attraction configuration is referenced by the form 101 and loaded as specified by the reference. In some embodiments, the field attraction module 101 loads field attraction weights for a form based on the type of form. For example, the field attraction module can obtain the field attraction weights from a database of field attraction weights for various types of forms.

After loading the field attraction weights, the field attraction module 115 monitors user interaction with the form 101 in order to apply the appropriate field attraction weights (Stage B). The field attraction module 115 can respond to mouse hover events, tab events that change focus between fields, click events, etc.

FIG. 2 depicts the example conceptual diagram of the field attraction module detecting activity in a region of a weighted field. In FIG. 2, the field attraction module 115 detects a mouse cursor 201 hovering within the boundaries of the activity regions of the field 103, the field 105, and the field 107 (Stage A). User interaction within a boundary of a field activates the field. For this illustration, the user interaction activates multiple fields (103, 105, 107) because the activity regions overlap.

The field attraction module 115 determines which of the active fields is associated with the greatest field attraction weight according to the field attraction configuration (Stage B). The field attraction module 115 determines that the field 103 is associated with a field attraction weight of 0. The field attraction module 115 determines that the field 105 is also associated with a field attraction weight of 0. The field attraction module 115 determines that the field 107 is associated with a field attraction weight of 4. The weights can take a variety of forms and are not necessarily specified integers as depicted in this example illustration. For instance, a field may be associated with an equation that accepts multiple variables (e.g., size of form, colors in form, number of fields, relative field attraction weights and absolute field attraction weights, etc.) to compute a weight instead of being a specific weight. In some embodiments, a field attraction module dynamically re-computes a field attraction weight. For example, a field attraction module computes an increasing field attraction weight the longer a mouse cursor remains within an activation region of the field. In some embodiments, the field attraction configuration associates multiple field attraction weights (125, 127)with a field. For example, stronger field attraction weights can be associated with the innermost zones of a field (e.g., zone 123) while weaker field attraction weights are associated with the outermost zones of the field (e.g., Zone 121)

With the field attraction weight of 4, the field attraction module 115 applies the determined field attraction weight to presentation of the form 101 to emphasize the field 107 (Stage C). In FIG. 2, application of the field attraction weight results in the field 107 (both the input field and the label for the field) being presented with larger font and additional graphics surrounding the field 107. Embodiments can apply the field attraction weights in accordance with different techniques. For example, the field attraction module 115 passes the value '4' as a parameter when invoking a function of the program that presents the form 101. The function resets the font size to a value that corresponds to the field attraction weight of '4' (e.g., adds four to the default font size) and selects a graphic that corresponds to the field attraction weight of '4'. As another example, the field attraction module 115 selects a function that corresponds to the field attraction weight. Different functions are configured to emphasize the fields and/or the form differently. One of those functions is bound to the field attraction weight or a range of field attraction weights.

FIG. 3 depicts an example conceptual diagram of the field attraction module modifying presentation of the form when user interaction transitions to a different field. In FIG. 3, the field attraction module 115 detects that the mouse cursor 201 moves into the activity region of the field 111 and the field 109 (Stage A).

In response to activation of the field 109 and the field 111, the field attraction module 115 reads the field attraction configuration and determines which of the field 109 and the field 111 has the greatest field attraction weight (Stage B). In this example, the field 109 is associated with a field attraction weight of 2 and the field 111 is associated with a field attraction weight of 5.

After determining that the field 111 has a greater field attraction weight than the field 109, the field attraction module 115 applies the field attraction weight '5' to modify presentation of the form 101 to emphasize the field 111 (C). In FIG. 3, application of the field attraction weight of '5' presents the form 101 with an additional graphic around the field 111 and increases the font size of label and the input field of the field 111. The graphic around the field 111 is the same as the graphic that was presented around the field 107, except larger. Likewise, the font size for the field 111 is increased to a greater degree than was done for the field 107. The field 107 no longer has the graphic to emphasize the field. And the label for the field 107 has returned to the initial font size. The text entered into the input field of the field 107, however, is still presented with the larger font size. Embodiments do not necessarily persist an attraction effect for to a field after information is entered. In some embodiments, the field attraction effect is removed when a field is not activated and restored when the field is activated again. In some embodiments, fields are not emphasized after input has been received. In some embodiments, the attraction value or effect for a field is stored in the form to be used when the form is presented for review or reading.

Figure 4:
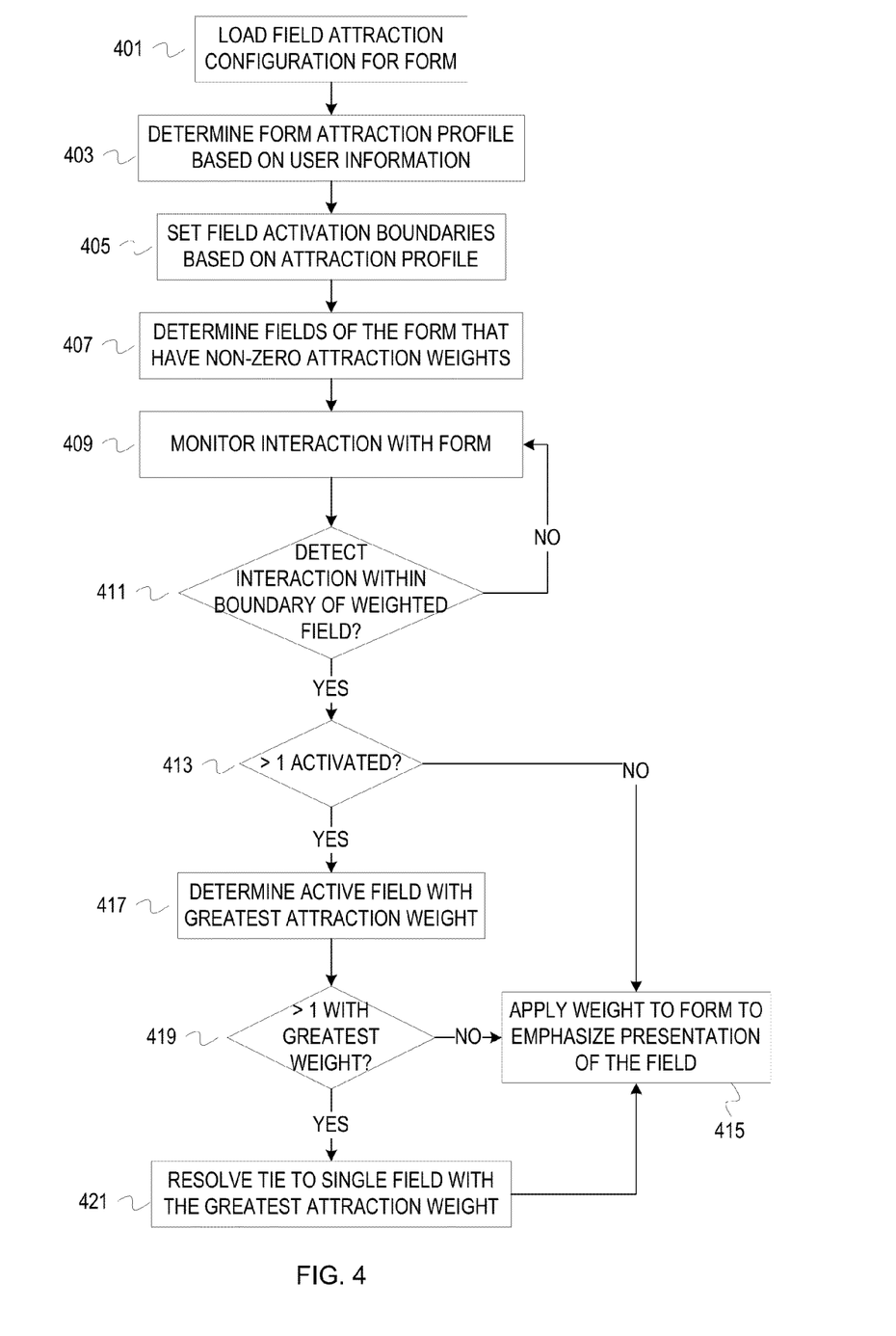
FIG. 4 depicts a flowchart of example operations for modifying presentation of a form to emphasize fields.

FIG. 4 depicts a flowchart of example operations for modifying presentation of a form to emphasize fields. At block 401, a field attraction configuration is loaded for a form. When a form is opened by a system, the field attraction configuration is loaded. The field attraction configuration informs the system how the form will be presented to attract interaction with particular fields of the form. Although the preceding examples illustrated field attraction configuration with absolute field attraction weights, embodiments are not so limited. A field attraction configuration can be associated with a field identifier with a reference to an attraction function. For example, field identifiers index to one of multiple field attraction functions. Each of the field attraction functions modifies presentation of the encompassing form to attract interaction to the corresponding field. In some embodiments, the field attraction configuration indicates an algorithm for computing an appropriate degree of attraction for a field. The field attraction formula can factor in distance from other fields, device type, number of fields, contrasts within the document, etc. In addition, the field attraction configuration can be associated with different field attraction weights and/or field attraction profiles with different users. For example, different sets of field attraction weights can be associated with different user roles or user identifiers. In some embodiments, different field attraction profiles can be specified for different modes of presenting a form. Different field attraction profiles comprise different field attraction configurations for different situations (e.g., read mode, edit mode, secure mode, author role, editor role, reviewer role, etc.). The field attraction configuration data can also modify the form to change activity regions, change field activation triggers, overlay a document map, etc. In addition, a field attraction configuration can include or reference heuristics or usage history for a form or type of form.

At block 403, a form attraction profile is determined based on user information. A field attraction module can request a login identity or login role from the operating system to determine whether a reader or editor form attraction profile should be used, for example. The field attraction module can also determine an appropriate attraction profile based on mode of the form (e.g., editing mode, secured mode, etc.). In some embodiments, industry specific roles can be defined and used in determining the form attraction profile (e.g., physician role, nurse role, patient role, software tester role, software quality assurance role, etc.). In some embodiments, the field attraction module can detect an alternative perception mode to select an appropriate form attraction profile. For example, an alternative perception profile may employ aural or tactile based techniques to attract interaction to fields instead of visually based techniques. The special needs profile can encompass the functions that would generate non-visual attraction cues. The alternative perception profile can indicate parameters used to direct the presenting system to employ other functions to generate the non-visual emphasis cues or to adjust emphasis cues (e.g., specify different levels of volume, different audio rhythms, different degrees of vibration, etc.).

At block 405, field activation boundaries are set based on the form attraction profile. The field activation boundaries define field activation regions for the fields of the form. The size of field activation regions can vary based on the form attraction profile. In addition, different form attraction profiles can indicate different techniques for activating a field and/or different techniques for triggering evaluation of a field for attracting interaction. For instance, a first form attraction profile limits evaluation of a field for attracting interaction to when a mouse cursor hovers while a second form attraction profile specifies that emphasis evaluation for certain fields is triggered by tabbing to a nearby field.

At block 407, fields of the form that have non-zero field attraction weights are determined. A field attraction module identifies those fields of the form that have not been given a weight (i.e., those fields that are not to be emphasized according to the form designer). A field is not necessarily associated with a static field attraction weight. For example, field attractions weights can adapt to usage history or heuristics. A form can be designed to incorporate importance of a field as implied by user interaction, as well as the form author's perception of field importance. For instance, fields of a poll form are emphasized in accordance with field attraction weights defined by the poll author when the poll is presented to a user. The poll can later be presented to the poll author to attract interaction to those fields that were actually answered by the poll takers and de-emphasize those fields that were ignored by the majority of poll takers.

At block 409, interaction with the form is monitored.

At block 411, it is determined whether interaction is detected within the activation boundary of one or more weighted fields. A field attraction module can maintain a list of the fields with non-zero field attraction weights or non-null references to attraction functions. The field attraction module can maintain indications of the activation regions. If the interaction is not detected within an activation region of a weighted field, then control flows back to block 409. If interaction is detected, then control flows block 413.

At block 413, it is determined whether more than one field is active. If so, then control flows to block 417. If only one field is active, then control flows to block 415.

At block 417, the active field with the greatest field attraction weight is determined. A field attraction module evaluates the field attraction configuration to determine which of the active fields should be emphasized based on the weights. In some embodiments, all of the fields are emphasized in accordance with the field attraction configuration. The weights may be adjusted to prevent cluttering the form. If too many fields are emphasized or fields are competing for attraction, then the attraction may be transformed into noise by cancelling each other out.

At block 419, it is determined whether more than one field has the same greatest field attraction weight. If only one field has the greatest field attraction weight, then control flows to block 415. Otherwise, control flows to block 421.

At block 421, the tie among the fields with the greatest attraction field weight is resolved to a single field. When multiple fields are specified with a same degree of attraction, embodiments can choose to employ a function that resolves the tie to a single function. Resolving the tie can involve only emphasizing a single field, or emphasizing the fields to different degrees. In these example operations, a field attraction module reduces the candidates for attracting interaction to a single field. Resolving the tie can be done in accordance with various techniques. Embodiments can eliminate those fields with a location furthest from the point of interaction (e.g., furthest from the mouse cursor). Embodiments can prompt a user for election of one of the fields. Embodiments can consult heuristics and/or usage history to select from the tied fields. Once the tie is resolved, control flows to block 415.

After the field or fields to be emphasized are determined, the corresponding field attraction weight is applied to the form to attraction interaction to the field(s) at block 415. In some embodiments, a field is emphasized by rendering the entire form in accordance with the attraction configuration. In some embodiments, the field itself or area of the form near the field can be manipulated independent of other areas of the form. Embodiments are not limited to passively attracting interaction to a field. Embodiments can actively manipulate user interaction to attract or detract interaction with a field. In some embodiments, a sticky effect can be implemented to attract a user to a field. When a user drags a mouse cursor or other type of graphical user interface selection element within an activation region of a weighted field, the mouse cursor movement slows. A greater field attraction weights leads to a stronger sticky effect. In some embodiments, the field attraction module not only slows a mouse cursor or selection element, but the field attraction module pulls the mouse cursor or selection element towards the field. In some embodiments, tabbing or clicking within a field near a weighted field results in selection of the weighted field instead of the field that was actually selected. In some embodiments, a field attraction module detects a user typing into a field with a lower (or 0) field attraction weight and moves focus, as well as the text, to a field in the form with a greater field attraction weight. The reverse for detracting from a field is also possible. Embodiments can repel a mouse cursor or selection element.

The flowchart depicted in FIG. 4 is presented as an illustrative example to aid in understanding the inventive subject matter, and should not be used to limit embodiments of the inventive subject matter. Embodiments can implement additional operations, fewer operations, the operations in a different order, some operations in parallel, etc. For example, some embodiments do not perform block 407. And embodiments do not necessarily set boundaries as indicated block 405. When a focus is moved to a particular field, embodiments can employ predefined dependencies among fields, which were defined when the form was created, to determine any dependent fields that are to be emphasized. Some embodiments determine nearby fields within a certain number of pixels of a field that has obtained focus.

Although the examples provided herein describe modifying presentation of field to reflect the different degrees of attraction, embodiments are not so limited. Embodiments can apply a same or limited number of techniques for attracting interaction to a field, and apply the different field attraction weights to increase or decrease the activation region. Thus, the importance of a field is reflected in the greater activation region. Furthermore, embodiments are not limited to enhancing attraction. Embodiments can use weights to de-emphasize fields in a form. A field can be associated with fractional or negative field attraction weights. Or a field can be associated with a de-emphasizing function that modifies presentation of a form to de-emphasize a field.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, (e.g., hardware only) or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
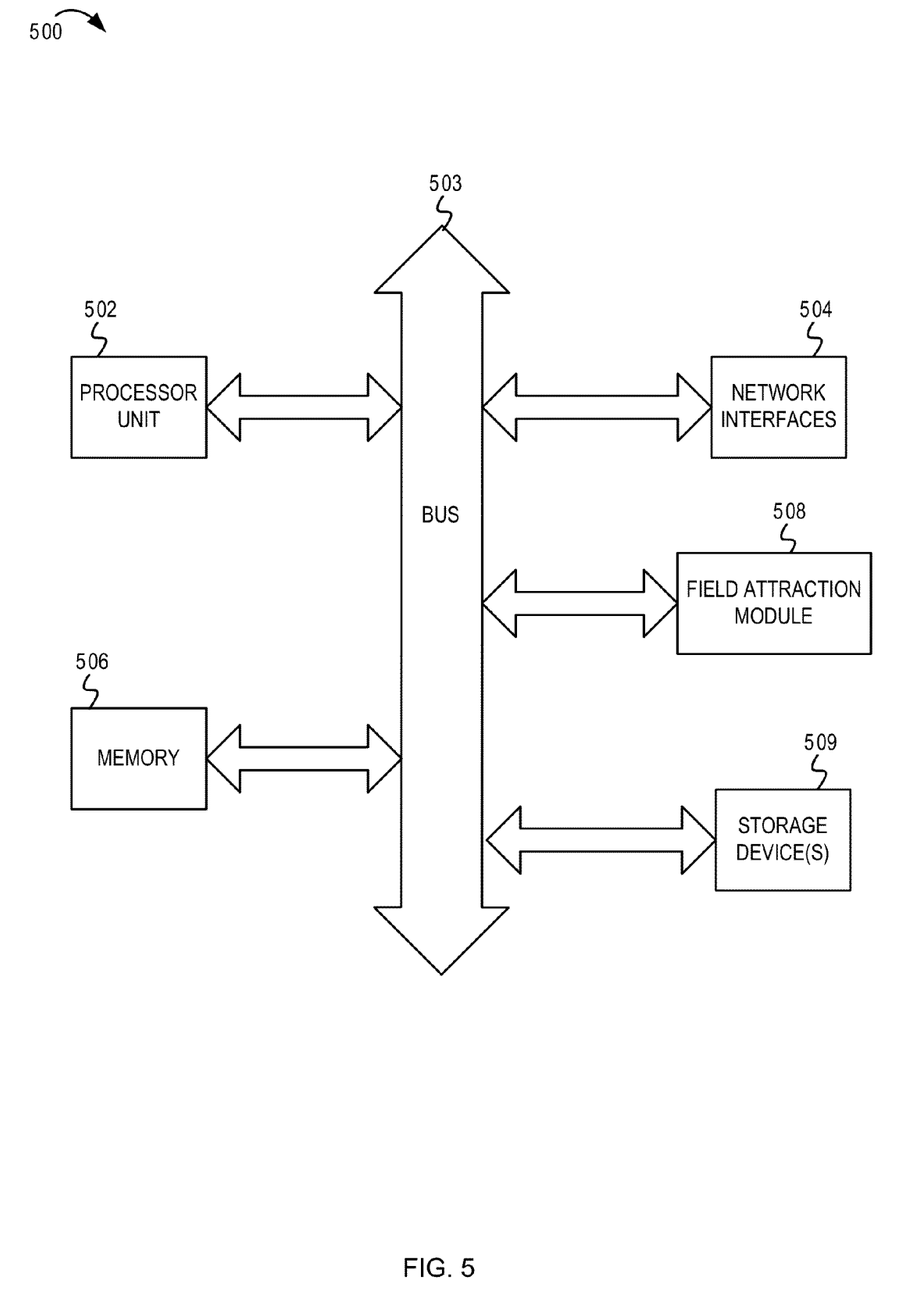
FIG. 5 depicts an example computer system.

FIG. 5 depicts an example computer system. A computer system 500 includes a processor unit 502 (possibly including multiple processors, multiple cores, multiple nodes, and/or implementing multi-threading, etc.). The computer system includes memory 506. The memory 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 504 (e.g., an ATM interface, an Ethernet interface, a Frame Relay interface, SONET interface, wireless interface, etc.), and a storage device(s) 509 (e.g., optical storage, magnetic storage, etc.). The system 500 also comprises a field attraction module 508. The field attraction module 508 detects when user interaction activates a field(s) of a form and modifies presentation of the form and/or the field(s) to attract/detract interaction to/from the field(s). The field attraction module 508 modifies the presentation and/or manipulates user interaction in accordance with field attraction configuration data of the form. Any one of these functionalities may be partially (or entirely) implemented in hardware and/or on the processor unit 502. For example, the functionality may be implemented with an application specific integrated circuit, in logic implemented in the processing unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the storage device(s) 509, the field attraction module 508, and the network interface 504 are coupled to the bus 503. Although illustrated as being coupled to the bus 503, the memory 506 can be coupled to the processor unit 502.

While the embodiments are described with reference to various implementations and exploitations, it will be understood that these embodiments are illustrative and that the scope of the inventive subject matter is not limited to them. In general, techniques for modifying presentation of a form to dynamically attract or detract interaction with fields as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    detecting, in a digital document, interaction corresponding to a plurality of fields of the digital document;
    determining field attraction weights associated with the plurality of fields, wherein the field attraction weights represent a degree to which presentation of the digital document is modified for selectively attracting interaction to at least one of the plurality of fields, wherein the field attraction weights are determined, based at least in part, on a plurality of zones associated with the at least one of the plurality of fields;
    determining that a first field of the plurality of fields is associated with a greatest of the field attraction weights; and
    modifying presentation of graphical attributes associated with the first field in the digital document to attract interaction to the first field in the digital document in accordance with the greatest of the field attraction weights, wherein graphical attributes associated with one or more fields in the plurality of fields other than the first field are unmodified.

2. The method of claim 1, wherein said modifying presentation of the digital document to attract interaction to the first field in the digital document in accordance with the greatest of the field attraction weights comprises one of:
    presenting the first field differently than initially presented in the digital document and differently than the others of the plurality of fields; and
    manipulating user interaction with the digital document to attract interaction to the first field.

3. The method of claim 1, further comprising:
    receiving input for the first field; and
    in response to receiving the input for the first field, returning the graphical attributes associated with the first field to an unmodified state.

4. The method of claim 1 further comprising:
    determining that a second field of the plurality of fields is associated with a second field attraction weight of the field attraction weights that is non-zero; and
    modifying presentation of the digital document to attract interaction to the second field in accordance with the second field attraction weight, wherein presentation of the digital document to attract interaction with the second field in accordance with the second field attraction weight attracts interaction to the second field to a lesser degree than the first field and to a greater degree than others of the plurality of fields.

5. The method of claim 1, wherein the digital document is presented with one of a web browser, a word processing application, a spreadsheet application, and a portable document presentation application.

6. The method of claim 1, wherein said detecting interaction corresponding to the plurality of fields of the digital document comprises one of:
    detecting user activity proximate to the plurality of fields; and
    detecting field focus on one of the plurality of fields.

7. The method of claim 1, wherein the field attraction weights are provided as one or more of metadata within the digital document or a field attraction configuration associated with the digital document.

8. The method of claim 1 further comprising:
    accessing at least one of heuristics and usage history corresponding to the digital document,
    wherein said determining the field attraction weights associated with the plurality of fields comprises adjusting one or more specified field attraction weights to generate the field attraction weights.

9. The method of claim 1 further comprising:
    determining a presentation mode currently associated with the digital document, the presentation mode comprising one or more of a read mode, an edit mode or a secure mode;
    wherein said determining the field attraction weights associated with the plurality of fields comprises selecting from a plurality of predefined field attraction weights based, at least in part, on the presentation mode.

10. A computer program product for dynamic digital document fields behavior, the computer program product comprising:
    a computer readable storage medium having computer usable program code embodied therewith, the computer usable program code comprising a computer usable program code configured to:
    detect, in a digital document, interaction corresponding to a plurality of fields of the digital document;
    determine field attraction weights associated with the plurality of fields, wherein the field attraction weights represent a degree to which presentation of the digital document is modified for selectively attracting interaction to at least one of the plurality of fields, wherein the field attraction weights are determined, based at least in part, on a plurality of zones associated with the at least one of the plurality of fields;
    determine that a first field of the plurality of fields is associated with a greatest of the field attraction weights; and
    modify presentation of the digital document to attract interaction to the first field in the digital document in accordance with the greatest of the field attraction weights.

11. The computer program product of claim 10, wherein the computer usable program code configured to modify presentation of the digital document to attract interaction to the first field in the digital document in accordance with the greatest of the field attraction weights comprises the computer usable program code configured to one of:

present the first field differently than initially presented in the digital document and differently than others of the plurality of fields; and manipulate user interaction with the digital document to attract interaction to the first field.

12. The computer program product of claim 10, wherein the computer usable program code configured to modify presentation of the digital document to attract interaction to the first field comprises the computer usable program code configured to at least one of decrease speed of a graphical user interface selection element if moved away from the first field and increase speed of the graphical user interface selection element if moved towards the first field, change focus or selection from a second of the plurality of fields to the first field, and move input from a second of the plurality of the fields to the first field.

13. The computer program product of claim 10, wherein the computer usable program code is further configured to:
determine that a second field of the plurality of fields is associated with a second field attraction weight of the field attraction weights that is non-zero; and
modify presentation of the digital document to attract interaction to the second field in accordance with the second field attraction weight, wherein presentation of the digital document to attract interaction with the second field in accordance with the second field attraction weight attracts interaction to the second field to a lesser degree than the first field and to a greater degree than others of the plurality of fields.

14. The computer program product of claim 10, wherein the digital document is presented with one of a web browser, a word processing application, a spreadsheet application, and a portable document presentation application.

15. The computer program product of claim 10, wherein the computer usable program code configured to detect interaction corresponding to the plurality of fields of the digital document comprises the computer usable program code configured to one of:
detect user activity proximate to the plurality of fields; and
detect field focus on one of the plurality of fields.

16. The computer program product of claim 15, wherein the computer usable program code configured to detect user activity proximate to the plurality of fields comprises the computer usable program code configured to detect user activity within a boundary of at least one of the plurality of fields.

17. The computer program product of claim 10, wherein the computer usable program code is further configured to:
access at least one of heuristics and usage history corresponding to the digital document,
wherein the computer usable program code configured to determine the field attraction weights associated with the plurality of fields comprises the computer usable program code configured to adjust one or more specified field attraction weights to generate the field attraction weights.

18. The computer program product of claim 10, wherein the computer usable program code is further configured to:
determine a user role currently associated with the digital document,
wherein the computer usable program code configured to determine the field attraction weights associated with the plurality of fields comprises the computer usable program code configured to select from a plurality of predefined field attraction weights based, at least in part, on the user role.

19. An apparatus comprising:
a processor unit;
a computer readable storage medium coupled with the processor unit; and
a field attraction module operable to,
detect, in a digital document, interaction corresponding to a plurality of fields of the digital document;
determine field attraction weights associated with the plurality of fields, wherein the field attraction weights represent a degree to which presentation of the digital document is modified for selectively attracting interaction to at least one of the plurality of fields, wherein the field attraction weights are determined, based at least in part, on a plurality of zones associated with the at least one of the plurality of fields;
determine that a first field of the plurality of fields is associated with a greatest of the field attraction weights; and
modify presentation of the digital document to attract interaction to the first field in the digital document in accordance with the greatest of the field attraction weights.

20. The apparatus of claim 19 wherein a field has at least two zones associated with the field, and wherein a field attraction weight for a zone of the at least two zones is based at least in part, on a proximity of the zone to the field associated with the zone.

* * * * *